United States Patent
Paglia et al.

(10) Patent No.: US 10,911,832 B2
(45) Date of Patent: Feb. 2, 2021

(54) METHODS, SYSTEMS, AND MEDIA FOR FACILITATING INTERACTION BETWEEN VIEWERS OF A STREAM OF CONTENT

(71) Applicant: Google LLC, Mountain View, CA (US)

(72) Inventors: Marco Paglia, San Francisco, CA (US); Andrew Poes, Millbrae, CA (US); John Gregg, San Francisco, CA (US); Christopher Cooke, Mountain View, CA (US); Reed Morse, Palo Alto, CA (US); Jonah Goldsaito, San Francisco, CA (US); Jokubas Zukerman, San Francisco, CA (US); Chad Sager, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/218,911

(22) Filed: Jul. 25, 2016

(65) Prior Publication Data

US 2018/0027298 A1    Jan. 25, 2018

(51) Int. Cl.
*H04N 21/4788* (2011.01)
*H04N 21/472* (2011.01)
(Continued)

(52) U.S. Cl.
CPC ......... *H04N 21/4788* (2013.01); *H04L 51/04* (2013.01); *H04N 21/234* (2013.01);
(Continued)

(58) Field of Classification Search
CPC ............ H04N 21/4788; H04N 21/234; H04N 21/4424; H04N 21/47217; H04N 21/4882;
(Continued)

(56) References Cited

U.S. PATENT DOCUMENTS 7,143,428 B1 * 11/2006 Bruck ............... H04N 5/44543
725/37
8,700,714 B1 * 4/2014 Pan .................. H04N 21/2668
709/206
(Continued)

FOREIGN PATENT DOCUMENTS

| CN | 101449582 | 6/2009 |
| CN | 101631230 | 1/2010 |
| CN | 103716709 | 4/2014 |
| CN | 103902808 | 7/2014 |

OTHER PUBLICATIONS

International Search Report and Written Opinion dated Nov. 9, 2017 in International Patent Application No. PCT/US2017/043767.
(Continued)

*Primary Examiner* — Hai V Tran
(74) *Attorney, Agent, or Firm* — Byrne Poh LLP

(57) ABSTRACT

Methods, systems, and media for facilitating interaction between viewers of a stream of content are provided. In some embodiments, the method comprises: receiving a request to begin presenting a stream of content, wherein the stream of content corresponds to a collection of videos presented sequentially; identifying a counter value associated with a duration of time elapsed since a creator of the stream of content initiated presentation of the stream of content; determining a playback position of the stream of content based on the counter value; causing the stream of content to be presented at the determined playback position; receiving an input to display a chat interface; and causing the chat interface to be presented in connection with the presentation of the stream of content, wherein the chat interface includes messages transmitted from a plurality of user devices that are also presenting the stream of content.

21 Claims, 9 Drawing Sheets

(51) Int. Cl.
  *H04N 21/442* (2011.01)
  *H04N 21/234* (2011.01)
  *H04N 21/488* (2011.01)
  *H04L 12/58* (2006.01)
  *H04N 21/482* (2011.01)
  *H04N 21/475* (2011.01)
  *H04N 21/242* (2011.01)
  *H04N 21/2668* (2011.01)
  *H04N 21/262* (2011.01)
  *H04N 21/2387* (2011.01)

(52) U.S. Cl.
  CPC ....... *H04N 21/242* (2013.01); *H04N 21/2668* (2013.01); *H04N 21/26258* (2013.01); *H04N 21/4424* (2013.01); *H04N 21/4758* (2013.01); *H04N 21/47217* (2013.01); *H04N 21/4826* (2013.01); *H04N 21/4882* (2013.01); *H04N 21/2387* (2013.01)

(58) Field of Classification Search
  CPC ........... H04N 21/4826; H04N 21/4758; H04N 21/242; H04N 21/2668; H04N 21/26258; H04N 21/2387; H04L 51/04
  USPC .................. 725/37, 91, 9, 24, 135; 386/230; 709/205, 206; 348/E5.106
  See application file for complete search history.

(56) References Cited

U.S. PATENT DOCUMENTS

| | | | |
|---|---|---|---|
| 9,246,856 B1* | 1/2016 | Pan | H04N 21/2668 |
| 2003/0196206 A1* | 10/2003 | Shusman | G06Q 30/02 725/91 |
| 2005/0105888 A1* | 5/2005 | Hamada | G11B 19/025 386/230 |
| 2006/0259923 A1* | 11/2006 | Chiu | H04N 5/44543 725/24 |
| 2008/0034041 A1* | 2/2008 | Kang | H04N 21/25866 709/205 |
| 2010/0017474 A1* | 1/2010 | Kandekar | H04N 7/17318 709/205 |
| 2012/0137316 A1* | 5/2012 | Elizarov | H04H 20/38 725/9 |
| 2013/0159858 A1* | 6/2013 | Joffray | H04N 21/4788 715/719 |
| 2016/0080817 A1* | 3/2016 | Chai | H04N 21/4788 725/43 |

OTHER PUBLICATIONS

Examination Report dated Aug. 11, 2020 in EP Patent Application No. 17755316.1.
Office Action dated Aug. 14, 2020 in CN Patent Application No. 201780043789.0.

* cited by examiner

# METHODS, SYSTEMS, AND MEDIA FOR FACILITATING INTERACTION BETWEEN VIEWERS OF A STREAM OF CONTENT

TECHNICAL FIELD

The disclosed subject matter relates to methods, systems, and media for facilitating interaction between viewers of a stream of content.

BACKGROUND

Many people enjoy watching streams of content that are synchronized in their presentation to multiple people, such as a television program that is broadcast to many people. Additionally, people enjoy interacting with others who are watching the same stream of content, for example, to discuss a plotline or express their thoughts about an event. However, it can be difficult to interact with other viewers of the same stream of content as the stream of content is being broadcast.

Accordingly, it is desirable to provide new methods, systems, and media for facilitating interaction between viewers of a stream of content.

SUMMARY

Methods, systems, and media for facilitating interaction between viewers of a stream of content are provided.

In accordance with some embodiments of the disclosed subject matter, a method for facilitating interaction between viewers of a stream of content is provided, the method comprising: receiving, from a first user device, a request to begin presenting a stream of content, wherein the stream of content corresponds to a collection of videos presented sequentially; identifying a counter value associated with a duration of time elapsed since a creator of the stream of content initiated presentation of the stream of content from a second user device; determining a playback position of the stream of content on the first user device based on the counter value; causing the stream of content to be presented on the first user device at the determined playback position; receiving, from the first user device, an input to display a chat interface on the first user device; and causing the chat interface to be presented on the first user device in connection with the presentation of the stream of content, wherein the chat interface includes messages transmitted from a plurality of user devices other than the first user device that are also presenting the stream of content.

In accordance with some embodiments of the disclosed subject matter, a system for facilitating interaction between viewers of a stream of content is provided, the system comprising: a hardware processor that is programmed to: receive, from a first user device, a request to begin presenting a stream of content, wherein the stream of content corresponds to a collection of videos presented sequentially; identify a counter value associated with a duration of time elapsed since a creator of the stream of content initiated presentation of the stream of content from a second user device; determine a playback position of the stream of content on the first user device based on the counter value; cause the stream of content to be presented on the first user device at the determined playback position; receive, from the first user device, an input to display a chat interface on the first user device; and cause the chat interface to be presented on the first user device in connection with the presentation of the stream of content, wherein the chat interface includes messages transmitted from a plurality of user devices other than the first user device that are also presenting the stream of content.

In accordance with some embodiments of the disclosed subject matter, a non-transitory computer-readable medium containing computer executable instructions that, when executed by a processor, cause the processor to perform a method for facilitating interaction between viewers of a stream of content is provided, the method comprising: receiving, from a first user device, a request to begin presenting a stream of content, wherein the stream of content corresponds to a collection of videos presented sequentially; identifying a counter value associated with a duration of time elapsed since a creator of the stream of content initiated presentation of the stream of content from a second user device; determining a playback position of the stream of content on the first user device based on the counter value; causing the stream of content to be presented on the first user device at the determined playback position; receiving, from the first user device, an input to display a chat interface on the first user device; and causing the chat interface to be presented on the first user device in connection with the presentation of the stream of content, wherein the chat interface includes messages transmitted from a plurality of user devices other than the first user device that are also presenting the stream of content.

In accordance with some embodiments of the disclosed subject matter, a system for facilitating interaction between viewers of a stream of content is provided, the system comprising: means for receiving, from a first user device, a request to begin presenting a stream of content, wherein the stream of content corresponds to a collection of videos presented sequentially; means for identifying a counter value associated with a duration of time elapsed since a creator of the stream of content initiated presentation of the stream of content from a second user device; means for determining a playback position of the stream of content on the first user device based on the counter value; means for causing the stream of content to be presented on the first user device at the determined playback position; means for receiving, from the first user device, an input to display a chat interface on the first user device; and means for causing the chat interface to be presented on the first user device in connection with the presentation of the stream of content, wherein the chat interface includes messages transmitted from a plurality of user devices other than the first user device that are also presenting the stream of content.

In some embodiments, the chat interface includes a first portion that includes messages transmitted by the creator of the stream of content, and wherein the messages transmitted from the plurality of user devices that are also presenting the stream of content are presented in a second portion of the chat interface.

In some embodiments, an initial position of each video within the collection of videos corresponding to the stream of content is specified by the creator of the stream of content.

In some embodiments, the system further comprises: means for receiving a plurality of votes from a second plurality of user devices; and means for modifying the collection of videos corresponding to the stream of content based on the plurality of votes.

In some embodiments, the means for modifying the collection of videos comprises means for adding a video associated with the plurality of votes to the collection of videos.

In some embodiments, means for modifying the collection of videos comprises means for moving a position of a video associated with the plurality of votes within the collection of videos.

In some embodiments, means for moving the position of the video associated with the plurality of votes comprises means for causing the video to be played after presentation of a video that is currently being presented is finished.

In some embodiments, the stream of content has a start point and an end point, and the system further comprises: means for initiating presentation of the stream of content at the start point in response to receiving an indication from the second user device associated with the creator of the stream of content; means for determining that presentation of the stream of content has reached the end point; and means for causing the stream of content to be presented from the start point.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
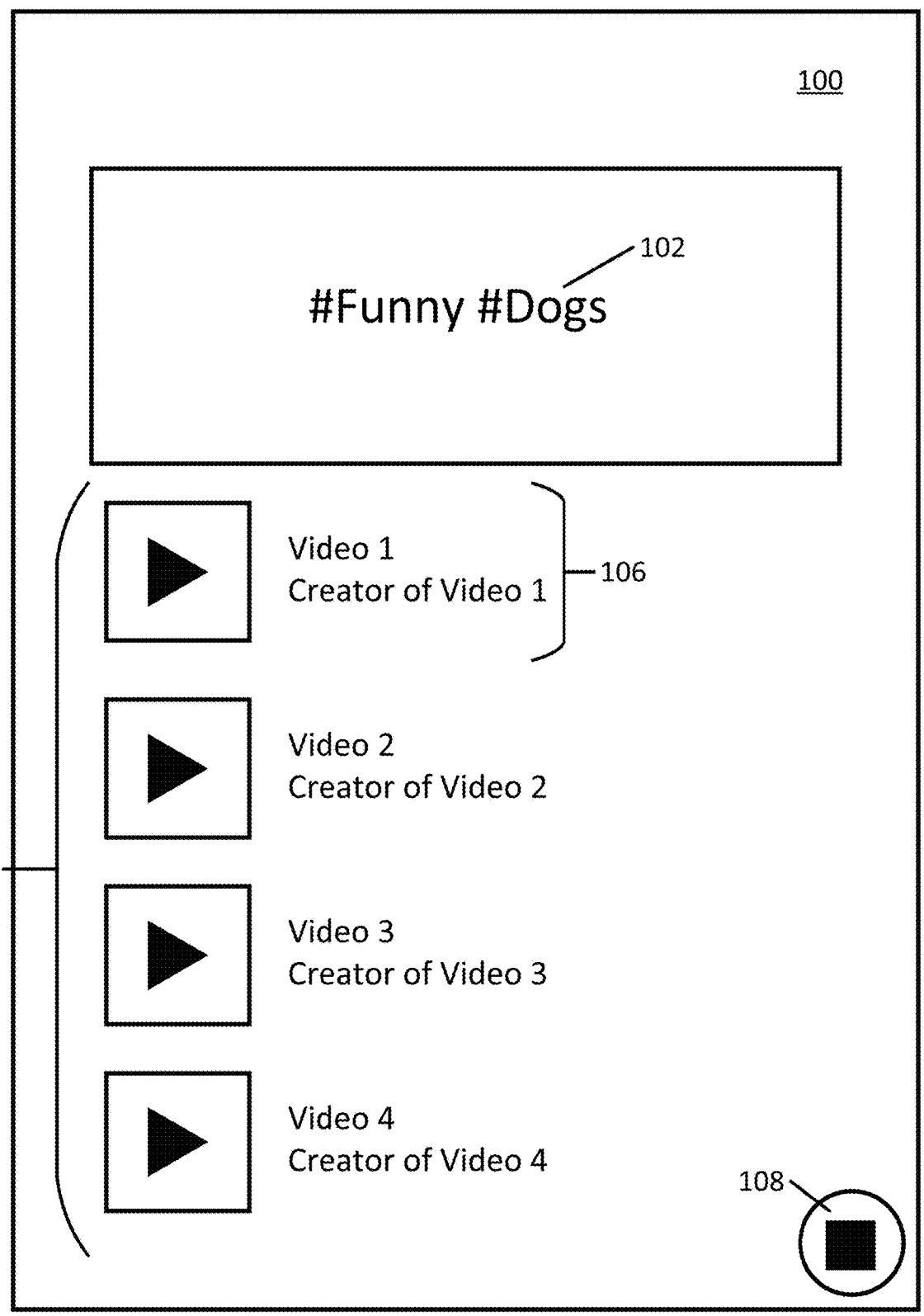
FIG. 1 shows an example of a user interface for creating a collection of media content in accordance with some embodiments of the disclosed subject matter.

In accordance with various embodiments, mechanisms (which can include methods, systems, and media) for facilitating interaction between viewers of a stream of content are provided.

In accordance with some embodiments, the mechanisms described herein can allow a first user to create a collection of videos that can be synchronized when streamed to multiple user devices. For example, in some embodiments, the collection of videos can include a series of videos that are played sequentially, and each user device viewing the stream of content can be viewing the same video within the collection of videos at the same playback position at a particular point in time. In some embodiments, the first user or content creator can create the collection of videos by selecting one or more videos to include in the collection, arranging the videos in a particular order, and indicating a time at which the collection of videos are to begin being streamed.

In accordance with some embodiments, the mechanisms described herein can allow a second user to select a particular stream of content for presentation on the second user's device. For example, the second user or content consumer can select a particular stream of content from multiple streams of content for presentation on the second user's device, where each stream of content has an associated playback position relative to the time at which the content creator associated with the stream of content initiated the playback of the stream. The mechanisms can then identify a counter value associated with the selected stream of content that indicates a playback position at which the stream of content should be presented on the user device, and can cause the stream of content to be presented from the identified playback position.

In some embodiments, the mechanisms can create and present one or more interfaces that allow multiple users viewing the stream of content to interact with each other and/or with the stream of content. For example, in some embodiments, the mechanisms can present a chat interface that allows users viewing the content to transmit messages that are presented within the chat interface. As another example, in some embodiments the mechanisms can present a chat interface that allows a creator of the stream of content to transmit messages that are presented to viewers of the stream of content. As yet another example, in some embodiments, the mechanisms can receive inputs from viewers of the stream of content that indicate votes for different videos, and can cause the collection of videos to be modified based on their votes. As a more particular example, in some embodiments, the votes can indicate that viewers want a particular video to be added to the collection of videos. As another more particular example, in some embodiments, the votes can indicate that viewers want a particular video to be presented next in the stream of content. As yet another more particular example, in some embodiments, the results of the voting interface can be transmitted to the content creator for use in modifying or updating the stream of content.

Note that, although the stream of content as discussed herein is generally described as presenting a collection of videos, in some embodiments, the stream of content can include any suitable types of content, including audio content, television programs, movies, live-streamed content, audiobooks, images, and/or any other suitable content. Furthermore, in instances where the stream of content includes content that is being live-streamed (e.g., a sports event, a news event, and/or any other suitable type of live-streamed event), the stream of content can include a single content item (e.g., a continuously updated scoreboard) rather than a collection of content items presented sequentially.

Additionally, note that although the collection of videos is generally described as being created by a user, in some embodiments, the collection of videos can be curated or generated by automatically selecting videos from a corpus of videos, for example, based on videos that are related to a particular topic, videos that are currently popular, and/or based on any other suitable information. In another example, in some implementations, the collection of videos can be organized as a channel of content items that are played back in a particular order. In such an example, a user can subscribe or otherwise select the channel of content items to being playback at a particular playback position.

Turning to FIG. 1, an example 100 of a user interface for allowing a user to create a collection of content items to stream is shown in accordance with some embodiments of the disclosed subject matter. As illustrated, user interface 100 can include a collection title 102, a group of content items 104, and a begin streaming input 108.

Collection title 102 can be any suitable title for a collection of content items. In some embodiments, collection title 102 can be specified by a creator of the collection of content items. In some embodiments, collection title 102 can include any suitable text, images, icons, graphics, animations, links, and/or any other suitable content. For example, as shown in FIG. 1, in some embodiments, collection title 102 can include one or more hashtags that, when selected, can cause a list of other collections of content and/or individual content items that are associated with the selected hashtag to be presented.

Group of content items 104 can include any suitable content items (e.g., videos, music, television programs, radio programs, live-streamed content, and/or any other suitable content items) selected by a creator of the collection of content items to be included in the collection of content items. For example, as shown in FIG. 1, group of content items 104 can include a video 106. In some embodiments, any suitable number (e.g., one, two, five, ten, fifty, and/or any other suitable number) of content items can be included in group of content items 104.

Note that, in some embodiments, a creator of the collection of content items can modify the collection of content items at any suitable time and/or in any suitable manner. For example, in some embodiments, the creator can add one or more content items to the collection of content items by selecting an indication of the content item (e.g., from a page presenting results of a query for particular content items, and/or from any other suitable page). As a more particular example, in some embodiments, the creator can add multiple content items simultaneously by importing a different collection of items (curated by the creator at a previous time and/or a collection of items curated by another entity). As another more particular example, in some embodiments, the creator can input a search query to search for content items within a corpus of content items for inserting into the collection of content items. As another example, in some embodiments, the creator can delete one or more content items from the collection of content items. As a more particular example, in some embodiments, the creator can select a particular content item included in group 104 (e.g., video 106) and can then indicate that the selected content item is to be removed from group 104. As yet another example, in some embodiments, the creator can rearrange content items included in group of content items 104. As a more particular example, in some embodiments, the creator can rearrange content items by dragging indications of content items to be moved within group 104 to new positions within group 104.

In some embodiments, begin streaming input 108 can be used to begin presentation of the collection of content items in an order specified by group of content items 104. For example, in some embodiments, presentation of the collection of content items can begin with a first content item in group of content items 104 in response to determining that a creator of the collection of content items has selected begin streaming input 108. In some embodiments, a server storing the collection of content items (e.g., a content server 302 as shown in and described below in connection with FIG. 3) can store an indication of a time at which begin streaming input 108 was selected to synchronize presentation of the stream of content across multiple user devices. Additionally or alternatively, in some embodiments, in response to determining that begin streaming input 108 has been selected, user interface 100 can present a selectable input (not shown) that causes presentation of the collection of content items to pause and/or stop. In some such embodiments, the server can store an indication of a second time at which the selectable input to pause presentation of the collection of content items was selected and can additionally or alternatively cause presentation of the collection of content items to be inhibited on any user devices presenting the stream of content. In instances where the collection of content items is algorithmically curated, begin streaming input 108 can be omitted, and presentation of the stream of content can begin at any suitable time. Additionally, in some embodiments, the creator of the collection of content items can indicate a time at which presentation of the stream of content is to begin (e.g., a specific date and/or time, a particular duration of time from a current point in time, and/or any other suitable time indication), and, in some such embodiments, begin streaming input 108 can be omitted.

Note that, presentation of the stream of content can begin and/or continue regardless of a number of user devices that are viewing the stream of content. For example, in some embodiments, presentation of the stream of content can begin and/or continue even if no user devices are viewing the stream of content. In some such embodiments, a counter value indicating a duration of time since begin streaming input 108 was selected can be maintained (for example, on a server storing and/or transmitting the stream of content), and transmission of the stream of content can begin in response to a request from a user device to view the stream of content at a playback position determined by the counter value and a time of the request.

Figure 2:
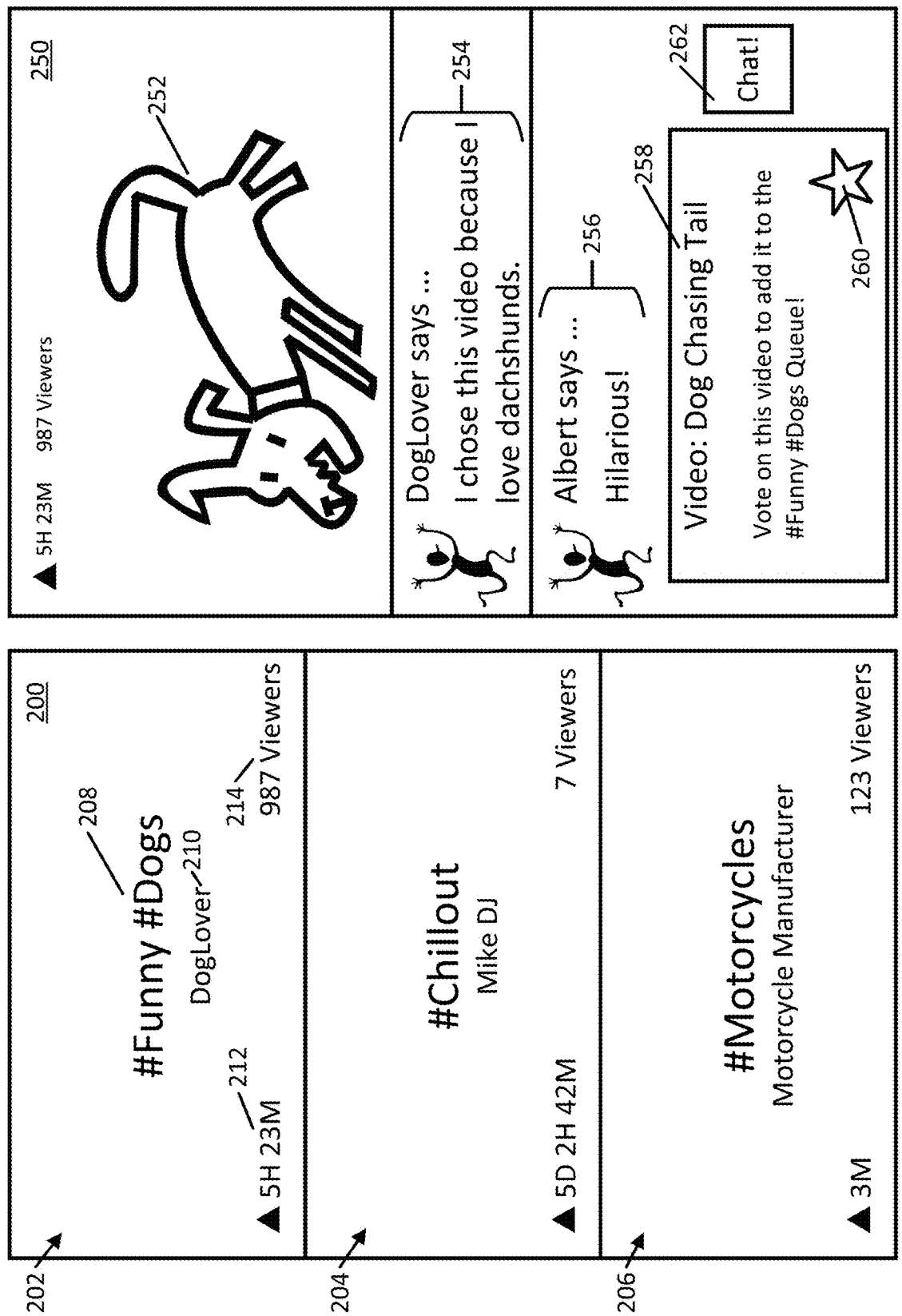
FIGS. 2A and 2B show examples of user interfaces for allowing a user to select a stream of content and interact with other users viewing the stream of content in accordance with some embodiments of the disclosed subject matter.

Turning to FIG. 2A, an example 200 of a user interface for selecting a stream of content to begin viewing is shown in accordance with some embodiments of the disclosed subject matter. As illustrated, in some embodiments, user interface 200 can include indications of available streams of content, such as individual streams of content 202, 204, and 206. Although three indications of available streams of content are shown in FIG. 2A, in some embodiments, any suitable number (e.g., one, three, five, ten, and/or any other suitable number) can be included. Additionally, in some embodiments, the available streams of content indicated in user interface 200 can be presented in any suitable order. For example, in some embodiments, the order can be based on topics of the streams of content (e.g., related topics can be grouped together), a number of viewers (e.g., streams of content with the largest number of viewers can be presented at the top of user interface 250, and/or in any other suitable order), a duration of time the stream of content has been presented (e.g., streams of content that have been presented for longer can be presented at the top of user interface 250, and/or in any other suitable order), and/or based on any other suitable information or combination of information.

In some embodiments, an indication of an individual stream of content, such as indication 202 can include any suitable information, such as a title 208, a creator indicator 210, a stream time indicator 212, and a number of viewers indicators 214.

Title 208 can be any suitable title for a stream of content represented by stream of content indicator 202. In some embodiments, title 208 can be specified by a creator of the collection of content items associated with the stream of content. In some embodiments, title 208 can include any suitable text, images, icons, graphics, links, and/or any other suitable content, as described above in connection with title 102 of user interface 100.

Creator indicator 210 can be any suitable identifier of a creator of the collection of content items associated with the stream of content. For example, in some embodiments, creator indicator 210 can be a name and/or a username associated with the creator. In some embodiments, creator indicator 210 can include any other suitable information, such as a profile picture and/or other image associated with the creator, an indication of whether the creator is currently online, and/or any other suitable information.

Stream time indicator 212 can indicate a duration of time elapsed since a creator of the stream of content initiated presentation of the stream of content. For example, in some embodiments, stream time indicator 212 can indication a duration of time elapsed since begin streaming input 108 of user interface 100 was selected by the creator of the stream of content. As shown in user interface 200, stream time indicator 212 can indicate the duration of time by indicating a number of days, hours, minutes, and/or any other suitable metric since presentation of the stream of content began. Note that, in instances where the creator of the stream of content has paused and re-started the stream of content, stream time indicator 212 can indicate a total duration of time that the stream of content has been presented, for example, by not including time that the stream of content was paused.

Number of viewers indicator 214 can be indicate a number of viewers who are currently viewing the stream of content associated with stream of content indicator 202. For example, number of viewers indicator 214 can indicate a number of user devices currently presenting the stream of content.

Turning to FIG. 2B, an example 250 of a user interface for allowing a user to interact with other users while viewing a selected stream of content is shown in accordance with some embodiments of the disclosed subject matter. As illustrated, user interface 250 can include video content 252, a creator message interface 254, a viewer message interface 256, a content voting interface 258, and a selectable input to begin chatting 262.

Video content 252 can be any suitable content associated with a video included in a collection of content items corresponding to the stream of content. In some embodiments, video content 252 can be presented in any suitable manner, such as in a video player window (not shown) within user interface 250. In some embodiments, any suitable content can be overlaid on video content 252, such as an animation, a video of a creator of the collection of videos corresponding to the stream of content, images and/or icons selected by viewers of the stream of content, and/or any other suitable content. For example, in instances where video content 252 is a sporting event, an animation of a scoreboard that presents a current score can be overlaid on video content 252. As another example, in some embodiments, viewers of the stream of content can select one or more images, icons, or graphics to overlay on video content 252, as described below.

Creator message interface 254 can be a message interface that displays messages sent by a creator of the collection of content items associated with the stream of content. In some embodiments, creator message interface 254 can be shown only when a creator of the collection of content items is currently online. In some embodiments, creator message interface 254 can be updated as the creator of the collection of content items transmits new messages. In some embodiments, creator message interface 254 can include any other suitable information, such as a name and/or username associated with the creator, an image and/or profile picture associated with the creator, and/or any other suitable information.

Viewer message interface 256 can be a message interface that displays messages sent by one or more users viewing the stream of content. In some embodiments, messages within viewer message interface 256 can be updated as new messages are transmitted. In some embodiments, messages within viewer message interface 256 can include any suitable content, such as text associated with a message, a name of a user who sent the message, an image and/or a profile picture of the user who sent the message, and/or any other suitable content.

Note that, in some embodiments, viewer message interface 256 can display any other suitable images, icons, animations, graphics, and/or any other suitable content. For example, in some embodiments, viewer message interface 256 can display one or more emojis (images or icons that can express an idea, an emotion, etc.) sent by viewers of video content 252. In some such embodiments, a keyboard that indicates a collection of available emojis can be presented to a user in connection with viewer message interface 256 for allowing the user to transmit emojis to be presented in the message interface. In this example, the type of input (e.g., the keyboard of available emojis) can be selected by the content creator for interacting with other viewers of the stream of content.

Content voting interface 258 can be any suitable interface for allowing a viewer of the stream of content to select and/or vote on additional content items to be included in the stream of content and/or moved to a new position within the collection of content items associated with the stream of content. For example, as shown in user interface 250, content voting interface 258 can include a selectable input 260 that, when selected, causes an indication that a viewer of user interface 250 has voted to include a video in the stream of content to a server hosting videos in the stream of content and/or transmitting the stream of content. In some embodiments, selectable input 260 can be any other suitable icon, such as a heart, a thumbs-up, and/or any other suitable image or indication of interest. Additionally, in some embodiments, content voting interface 258 can include a selectable input that indicates that the related content item is to be downvoted. For example, in some embodiments, the selectable input can be a thumbs-down symbol, and/or any other suitable symbol. Note that, in some embodiments, votes from multiple users can be tallied, and the votes can be used to modify the collection of content items associated with the stream of content items, as shown in and described below in connection with FIG. 5. For example, in response to receiving a particular indication of interest (e.g., five heart votes), the content item associated with content voting interface 258 can be automatically inserted into the stream of content and played back as the next content item in the collection of content items. In continuing this example, upon playing back the inserted content item, the content creator can be provided with an opportunity to indicate whether to add the content item into the collection of content item (e.g., for the next looped playback of the stream). Additionally or alternatively, information relating to the votes can be used by the content creator to modify the collection of content items.

In some embodiments, selection of selectable input to begin chatting 262 can cause an interface to allow a user to submit messages to be presented in viewer message interface 256 to be presented. For example, in some embodiments, selection of selectable input 262 can cause a keyboard to be presented in user interface 250.

Note that, in some embodiments, any suitable portions of user interface 250 can be dismissed and/or presented in response to user input. For example, in some embodiments, creator message interface 254, viewer message interface 256, and/or content voting interface 258 can be dismissed, for example, in response to determining that a user of user interface 250 has selected and/or swiped the interface off a screen presenting user interface 250. As another example, in some embodiments, creator message interface 254, viewer message interface 256, and/or content voting interface 258 can be presented within user interface 250 in response to determining that a user of user interface 250 has swiped a particular portion of a screen presenting user interface 250. Note that, in instances when one or more interfaces are not being presented in connection with video content 252, presentation of video content 252 can be resized in any suitable manner. For example, in instances when creator message interface 254, viewer message interface 256, and/or content voting interface 258 are not being presented within user interface 250, a video player window presenting video content 252 can be resized to cover a larger portion of user interface 250.

Additionally, in some embodiments, user interface 250 can include any other suitable features for allowing viewers of the stream of content to interact with each other and/or with the stream of content. For example, in some embodiments, user interface 250 can include an interface to allow viewers to select one or more stickers to overlay on particular elements of the stream of content that will then be included in the stream of content presented to the other viewers. As a more particular example, in some embodiments, the stickers can include graphics and/or images such as accessories that can be overlaid on an image of a person (e.g., hats, mustaches, glasses, and/or any other suitable items), images or animations of other items (e.g., books, animals, food items, etc.), and/or any other suitable graphics and/or images. As another example, in some embodiments, user interface 250 can be configured such that a user can draw on video content 252 (e.g., using a finger, a stylus, a mouse cursor, and/or in any other suitable manner), and the drawing can be overlaid on video content 252 as it is presented to the other viewers of the stream of content. In some embodiments, features that allow a user viewing the stream of content to insert images and/or drawings that are overlaid on the stream of content can require any suitable type of permission before the feature is available to the user. For example, in some embodiments, permission from a creator of the collection of videos corresponding to the stream of content can be required. As another example, in some embodiments, the user may be required to have viewed more than a predetermined duration of the stream of content (e.g., more than an hour, more than two hours, and/or any other suitable duration) before a particular feature is available. As yet another example, in some embodiments, the user may be required to have viewed more than a predetermined number of other streams of content previously before a particular feature is available.

Figure 3:
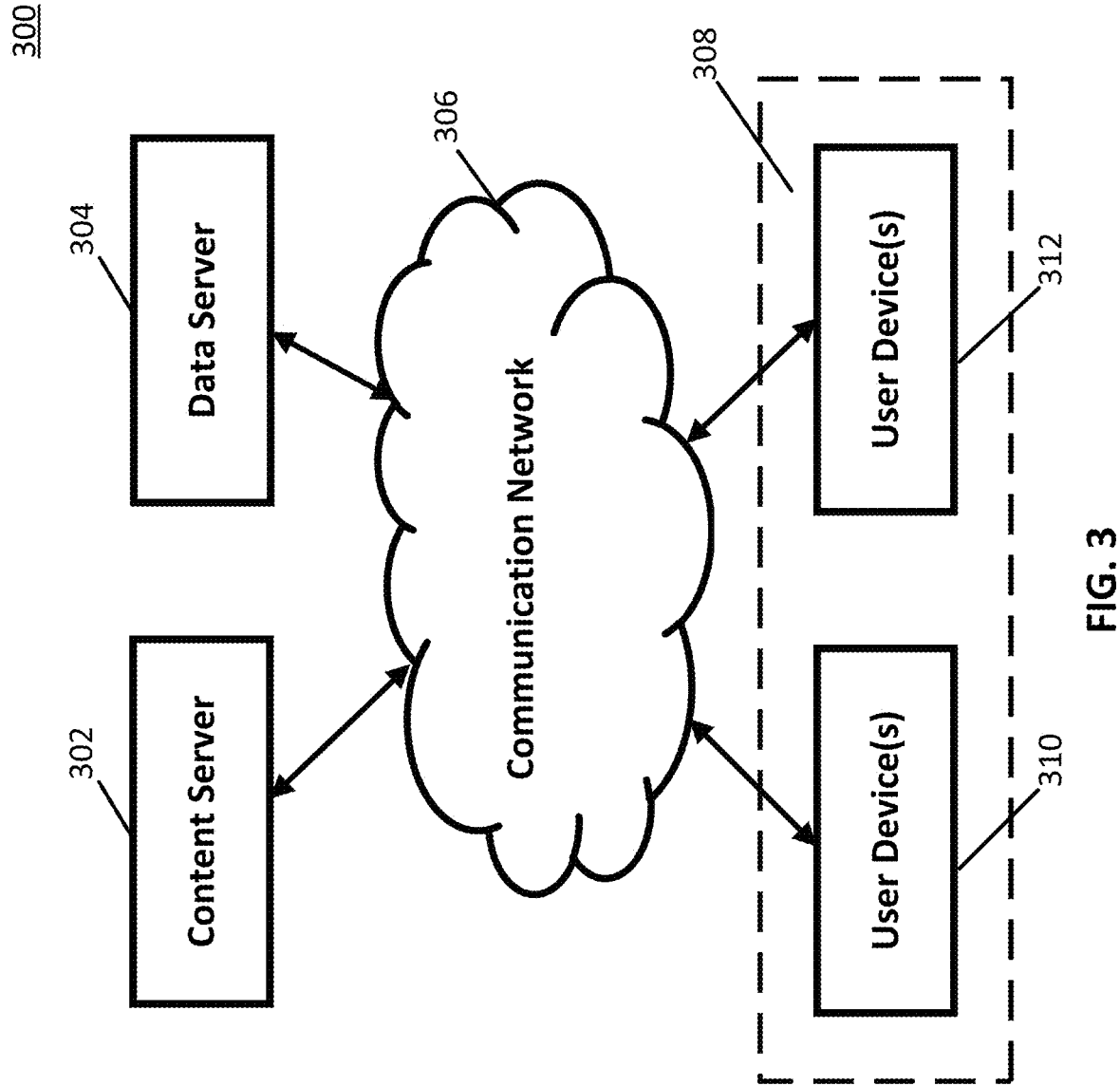
FIG. 3 shows a schematic diagram of an example of a system for facilitating interaction between viewers of a stream of content in accordance with some embodiments of the disclosed subject matter.

Turning to FIG. 3, an example 300 of hardware for facilitating interaction between users viewing a stream of content that can be used in accordance with some embodiments of the disclosed subject matter is shown. As illustrated, hardware 300 can include one or more servers, such as a content server 302, a data server 304, a communication network 306, and one or more user devices 308.

Content server 302 can be any suitable server for storing content items and/or collections of content items and delivering a stream of content to a user device 308 in some embodiments. For example, content server 302 can be a server that streams content items to user device 308 via communication network 306. As a more particular example, in some embodiments, content server 302 can stream a content item to user device 308 in response to receiving a request for a collection of content items from user device 308. Content provided by content server 302 can be any suitable content, such as video content, audio content, television programs, movies, cartoons, sound effects, audiobooks, web pages, news articles, streaming live content (e.g., a streaming radio show, a live concert, and/or any other suitable type of streaming live content), electronic books, search results and/or any other suitable type of content. Content can be created and uploaded to content server 302 by any suitable entity. In some embodiments, content server 302 can be omitted. In some embodiments, content server 302 can be omitted.

Data server 304 can be any suitable server for receiving and coordinating interaction between viewers of a stream of content. For example, in some embodiments, data server 304 can cause messages received from viewers of a stream of content to be presented in a message interface in connection with presentation of the stream of content on user device 308. As another example, in some embodiments, data server 304 can receive inputs from multiple user devices presenting a stream of content that indicate votes for videos to be included in the stream of content, and, in some embodiments, data server 304 can then cause videos receiving a relatively high number of votes to be included in the stream of content and/or moved to a different position in the stream of content. In some embodiments, data server 304 can be omitted.

Communication network 306 can be any suitable combination of one or more wired and/or wireless networks in some embodiments. For example, communication network 306 can include any one or more of the Internet, a mobile data network, a satellite network, a local area network, a wide area network, a telephone network, a cable television network, a WiFi network, a WiMax network, and/or any other suitable communication network.

User device(s) 308 can include any one or more user devices suitable for presenting a stream of content, receiving inputs from a user of user device 308 that indicate interactions with other viewers of the stream of content, and/or performing any other suitable functions. For example, in some embodiments, user device(s) 308 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 308 can include non-mobile devices such as a desktop computer, a set-top box, a television, a streaming media player, a game console, or any other suitable non-mobile device.

Although content server 302 and data server 304 are illustrated as separate devices, these devices can be combined into one device in some embodiments. Also, although only one each of content server 302 and data server 304 are shown in FIG. 3 to avoid over-complicating the figure, any suitable one or more of each device can be used in some embodiments.

Although only one user device 308 is shown in FIG. 3 to avoid over-complicating the figure, any suitable number of each of these devices, and any suitable types of these devices, can be used in some embodiments.

Figure 4:
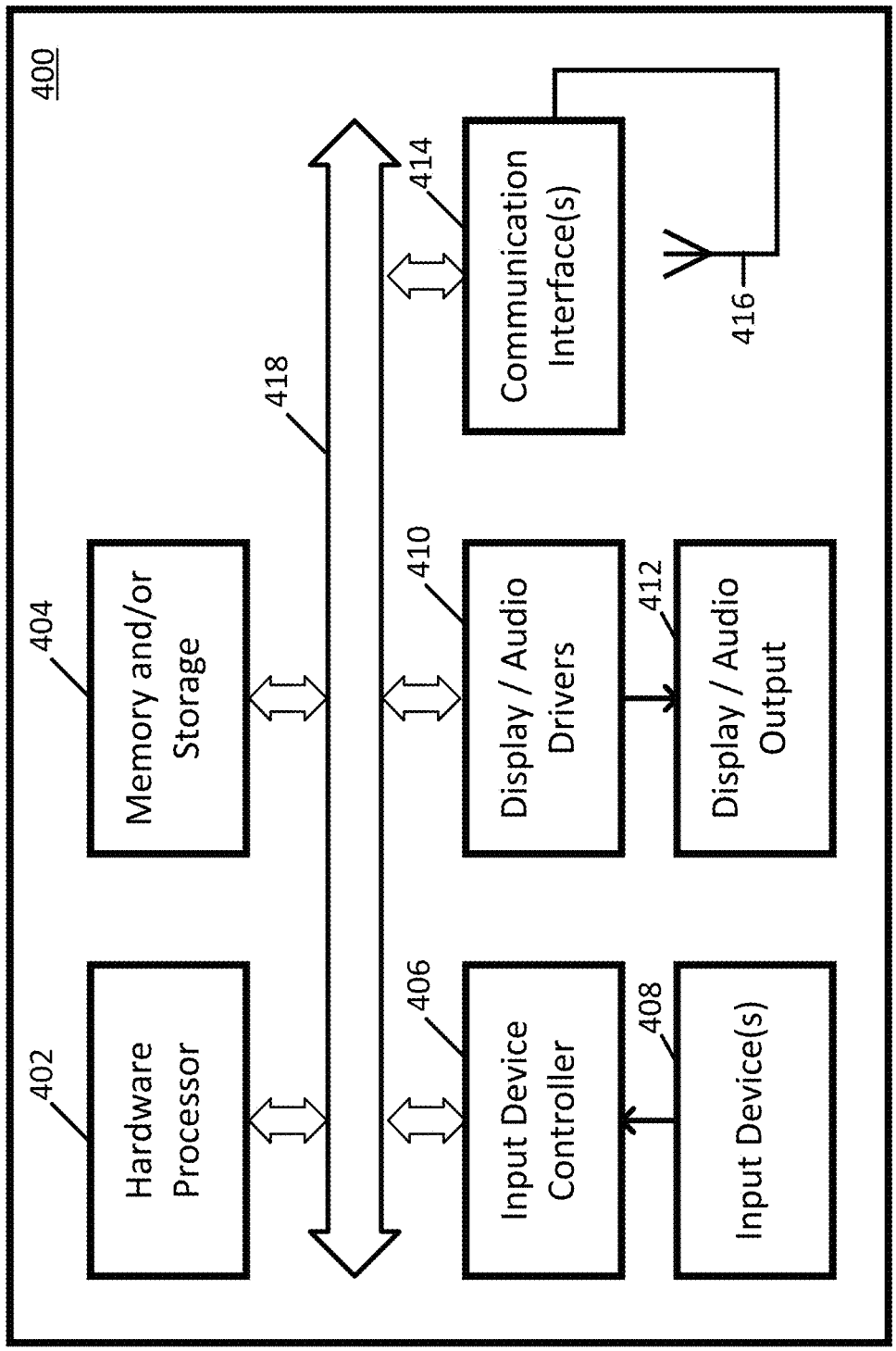
FIG. 4 shows an example of hardware that can be used in a server and/or a user device in accordance with some embodiments of the disclosed subject matter.

Content server 302, data server 304, and user device 308 can be implemented using any suitable hardware in some embodiments. For example, in some embodiments, devices 302, 304, and 308 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output circuitries 412 in some embodiments. For example, display/audio drivers 410 can be circuitry for driving an LCD display, a speaker, an LED, or any other type of output device.

Communication interface(s) 414 can be any suitable circuitry for interfacing with one or more communication networks, such as network 306 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted when not needed.

Bus 418 can be any suitable mechanism for communicating between two or more components 402, 404, 406, 410, and 414 in some embodiments.

Any other suitable components can be included in hardware 400 in accordance with some embodiments.

Figure 5:
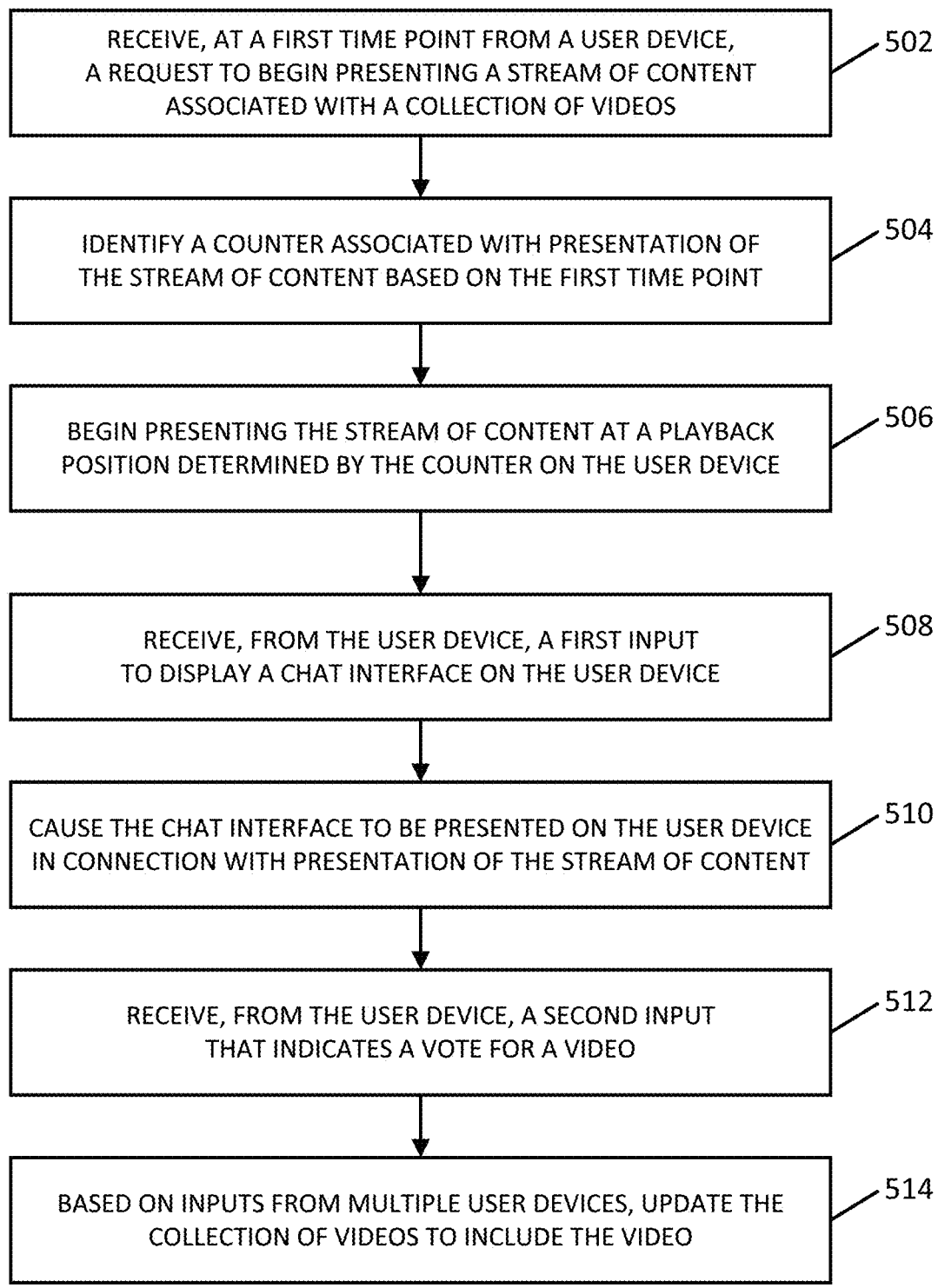
FIG. 5 shows an example of a process for facilitating interaction between viewers of a stream of content in accordance with some embodiments of the disclosed subject matter.

Turning to FIG. 5, an example 500 of a process for facilitating interactions between users viewing a stream of content is shown in accordance with some embodiments of the disclosed subject matter. In some embodiments, blocks of process 500 can be executed by content server 302, data server 304, and/or user device 308.

Process 500 can begin at 502 by receiving, at a first time point from a user device, a request to begin presenting a stream of content associated with a collection of videos. In some embodiments, the collection of videos can be created by any suitable entity and can include any suitable number of individual content items. As described above in connection with FIG. 2A, in some embodiments, the request to begin presenting the stream of content can be received based on determining that a user has selected a particular stream of content (e.g., from a home page listing different streams of content, from a link, and/or selected in any other suitable manner). In a particular example, a user interface can be presented that lists multiple streams of content with a stream representation (e.g., a thumbnail image) and a title (e.g., tags identifying the content contained in the stream of content), where the list is organized by number of viewers (or any other suitable criterion).

Process 500 can identify a counter value associated with presentation of the stream of content based on the first time point at 504. As described above in connection with FIG. 1, in some embodiments, the counter can begin timing presentation of the stream of content item in response to determining that a creator of the collection of videos has selected an input to begin presenting the stream of content. In some embodiments, the counter value can indicate a duration of elapsed time since the creator of collection of videos selected the input to begin presenting the stream of content until the first time point. In some embodiments, the counter value can be stored in any suitable location, such as in memory 404 of content server 302 and/or data server 304. Note that, in instances where presentation of the stream of content has been paused and restarted, the counter value can indicate a total duration of time the stream of content has been presented, excluding the time during which presentation of the stream of content was paused.

Note that, in some embodiments, presentation of the stream of content can begin and/or continue regardless of a number of user devices that are viewing the stream of content. For example, in some embodiments, presentation of the stream of content can begin and/or continue even if no user devices are viewing the stream of content. In some such embodiments, the counter value can be maintained and updated (for example, on a server storing and/or transmitting the stream of content), and transmission of the stream of content can begin in response to a request from a user device to view the stream of content at a playback position determined by the counter value and a time of the request. Alternatively, in some embodiments, the counter can be paused during times when no user devices are viewing the stream of content. For example, in instances where a stream of content was being presented to one or more user devices which then stopped viewing the stream of content, the counter can be paused during the time no devices were viewing the content and can be restarted at a time when at least one user device requests the stream of content. Additionally, in some embodiments, presentation of the stream of content can loop continuously. For example, in some embodiments, an end time of the stream of content can be specified (e.g., the end point of the last content item in the collection of content item corresponding to the stream of content, and./or any other suitable end point), and presentation of the stream of content can loop back to a start point (e.g., a beginning of a first content item in the collection of content items corresponding to the stream of content) upon reaching the end point. Therefore, in some embodiments, a particular user device may request to view a stream of content that has already been presented in its entirety one or more times.

At 506, process 500 can begin presenting the stream of content on the user device at a playback position determined by the counter value identified at block 504. For example, in some embodiments, if the counter value indicates that the stream of content has been presented for a particular duration of time, process 500 can identify a particular playback position within a video included in the collection of videos corresponding to the stream of content that corresponds to the particular duration of time. As a specific example, if the counter value indicates that the stream of content has been presented for 5 hours and 32 minutes, process 500 can identify the playback position within a specific video that corresponds to 5 hours and 32 minutes after presentation of the videos in the collection of videos began. In some embodiments, determining the playback position can be adjusted in any suitable manner to account for advertisements presented during the presentation of the stream of content that are not included in the collection of videos.

In some embodiments, process 500 can provide users of user devices that are viewing the stream of content with multiple options for interacting with other users of user devices that are viewing the stream of content. For example, users of user devices that are viewing the stream of content can provide textual content (e.g., chat content), graphical content (e.g., overlaid annotations, images, animations, etc.), etc.

Note that, in some embodiments, the creator of the collection of videos corresponding to the stream of content can provide audio information (e.g., voiceover content), textual content (e.g., chat content), and/or concurrently presented video content that is presented concurrently with the stream of content. An example 700 of a user interface for providing video from one or more creators of the collection of videos and/or one or more co-hosts of the stream of content is shown in accordance with some embodiments. In some embodiments, video content (e.g., video content 702) from the one or more co-hosts can be presented in connection with the stream of content that is currently being presented, such as in a corner of the user interface, at the top of the user interface, in a pop-up window, and/or in any other suitable location. In some embodiments, video and/or audio from the co-hosts of the stream of content can be minimized, closed and/or muted by viewers of user interface 700.

Process 500 can receive, from the user device, a first input to display a chat interface on the user device at 508. As shown in and described above in connection with FIG. 2B, in some embodiments, the chat interface can include a first chat interface for presenting messages submitted by the creator of the collection of videos associated with the stream of content and a second chat interface for presenting messages submitted by viewers of the stream of content. In some embodiments, the first input can be received in any suitable manner. For example, in some embodiments, the first input can be received based on a determination that a user of the user device has selected a particular input. As another example, in some embodiments, the first input can be received based on a determination that a user of the user device has swiped a screen associated with the user device in a particular manner and/or direction. Note that, in some embodiments, the chat interface(s) can be presented by default without user input.

Figure 6A:
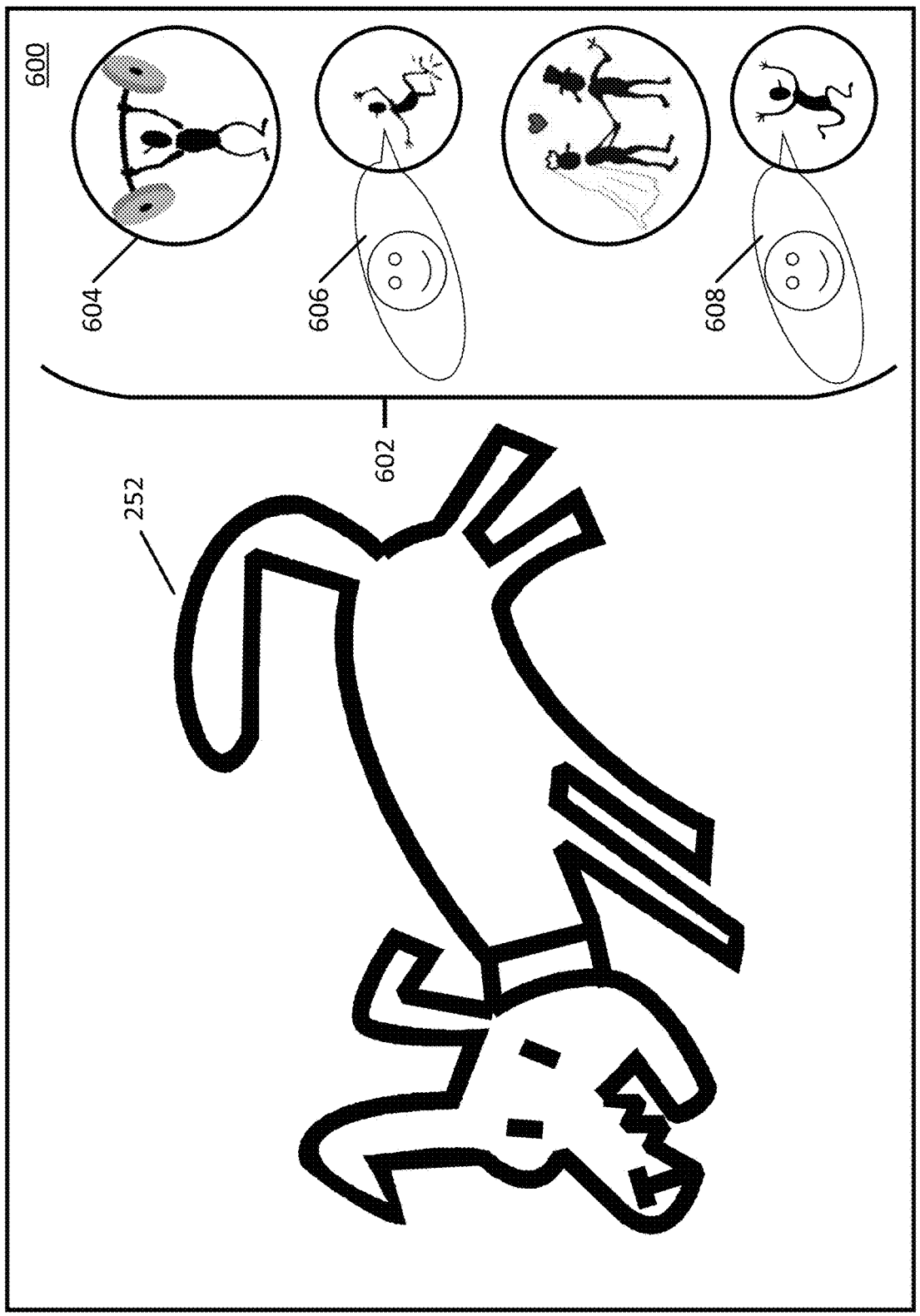
FIGS. 6A and 6B show examples of user interfaces for allowing users to interact in connection with a stream of content in accordance with some embodiments of the disclosed subject matter.
Figure 6B:
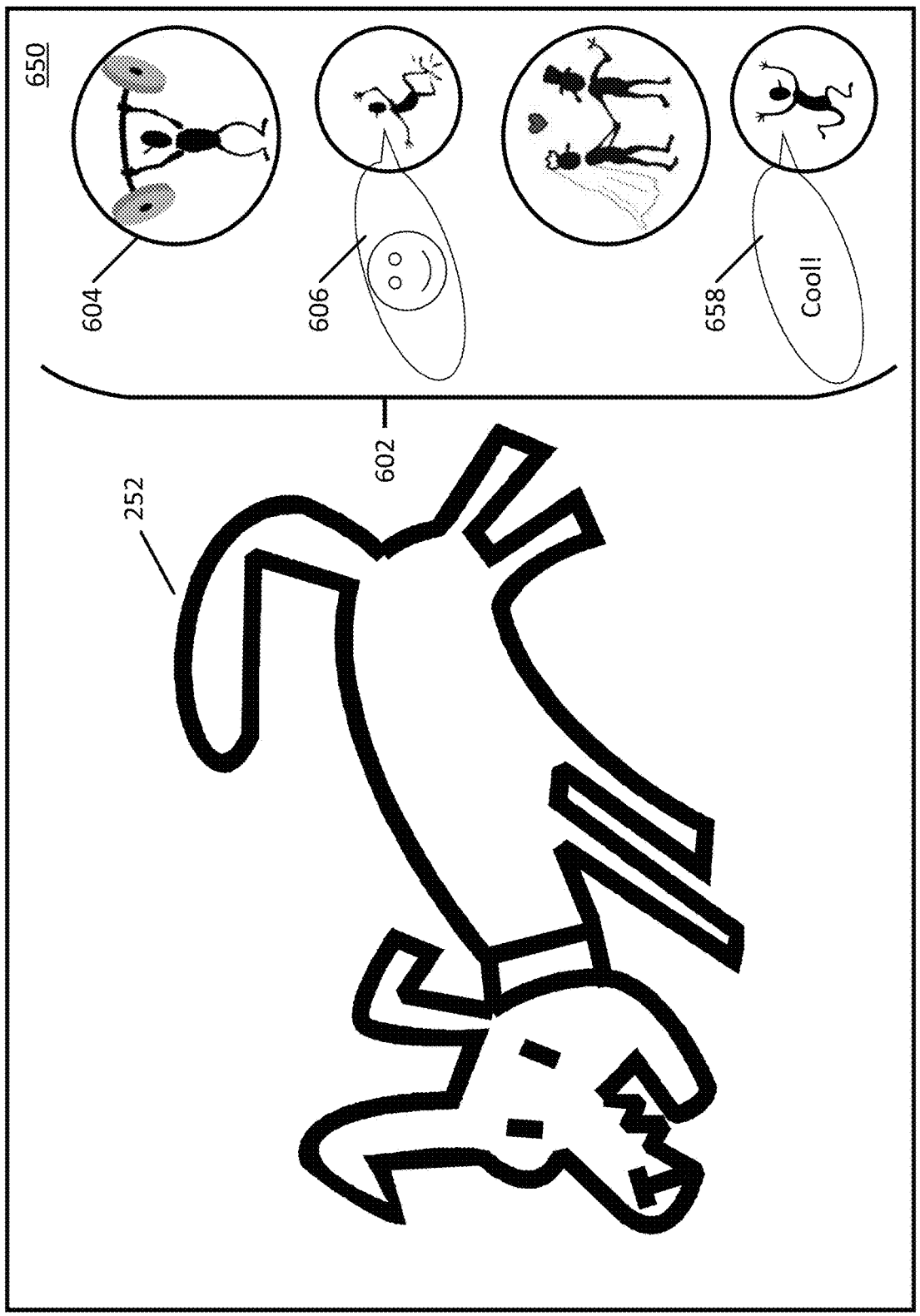
Figure 7:
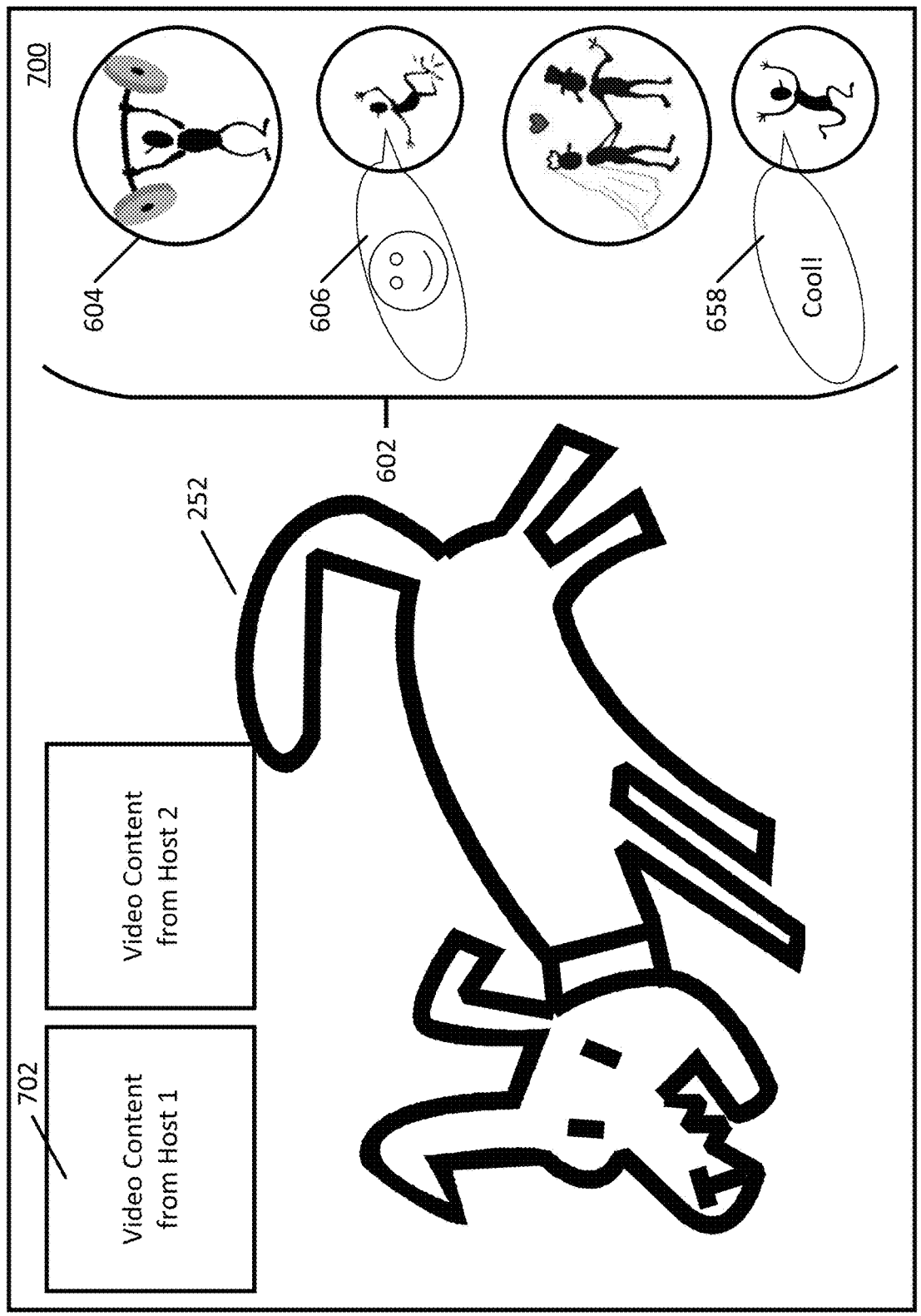
FIG. 7 shows an example of a user interface for overlaying video of a creator of a stream of content in connection with presentation of a content item of the stream of content in accordance with some embodiments of the disclosed subject matter.

In response to receiving the first input from the user device, process 500 can cause the chat interface(s) to be presented on the user device at 510. As shown in FIG. 2B, in some embodiments, the chat interface(s) can be presented concurrently with the presentation of the stream of content. For example, as shown in FIG. 2B, in some embodiments, the chat interface(s) can be presented below a video player window in which the stream of content is being presented. As another example, as shown in FIGS. 6A and 6B, the chat interface can be presented to the side (e.g., to the right and/or to the left) of a video player window in which the stream of content is being presented. Additionally, in some embodiments, the first chat interface corresponding to messages from the creator of the collection of videos can be presented in a separate portion of the user interface than the second chat interface corresponding to messages from viewers of the stream of content, and the two portions can be delineated in any suitable manner (e.g., with each chat interface presented in a separate panel, with a line separating the two chat interfaces, with messages from each chat interface presented in different colors and/or fonts, and/or in any other suitable manner). Additionally, in some embodiments, process 500 can determine that the first chat interface corresponding to messages from the creator of the collection of videos is to be presented only if the creator of the collection of videos is currently online (e.g., as determined based on whether a user account associated with the creator is currently authenticated with a server transmitting the stream of content, and/or in any other suitable manner).

In some embodiments, messages from either the creator of the collection of videos and/or viewers of the stream of content can be updated in any suitable manner. For example, in some embodiments, new messages from the creator of the collection of videos can be presented within the first chat interface and new messages from viewers of the stream of content can be presented within the second chat interface. In some embodiments, older messages can be deleted and/or moved in position in any suitable manner. For example, in some embodiments, older messages can be moved upward within a particular chat interface as newer messages are added at a bottom portion of the chat interface.

Turning to FIGS. 6A and 6B, in some embodiments, indications of viewers who are currently viewing the stream of content can be presented. For example, in some embodiments, a group of user indicators 602 can be presented within the chat interface, as shown in FIG. 6A, which can include individual icons, such as user profile picture 604. In some embodiments, a latest message posted by an individual user can be presented in connection with the corresponding user indicator, as shown in FIGS. 6A and 6B.

In some embodiments, messages from viewers can include any suitable combination of graphical elements and text, as shown in FIG. 6B (e.g., element 606 and text 658). Additionally or alternatively, in some embodiments, messages from viewers can be limited to icons, graphics, animations, and/or any other suitable graphical elements, as shown in FIG. 6A. For example, in some embodiments, users can submit one or more emojis (e.g., elements 606 and 608 of FIG. 6A) within the chat interface for presentation to other viewers of the stream of content. In some such embodiments, in instances where more than a predetermined number of users submit the same and/or similar graphical elements (e.g., smiley faces, question marks, a thumbs-up, a thumbs-down, and/or any other suitable graphical elements), visual characteristics of the user interface in which the stream of content is being presented and/or the chat interface in which the graphical elements are presented can be changed. For example, in some embodiments, the same and/or similar graphical elements can be presented in a larger size, a color of the graphical elements can be changed, a border around the graphical elements can be highlighted, a background and/or a border of a video player window presenting the stream of content can changed in color or highlighted, and/or any other suitable change can be implemented. In some embodiments, these changes in visual characteristics can indicate that more than a predetermined number of viewers (e.g., more than two, more than five, and/or any other suitable number) and/or more than a predetermined proportion of viewers (e.g., more than 50%, more than 70%, and/or any other suitable proportion) feel similarly about the content.

Referring back to FIG. 5, process 500 can receive, from the user device, a second input that indicates a vote for a video at 512. For example, as shown in FIG. 2B, in some embodiments, the second input can include a user selecting a particular input on a user interface that indicates a vote for a particular video, an endorsement of a particular video, a rating of a particular video (e.g., using a slider bar, by selecting a particular number of stars, and/or any other suitable type of rating), and/or any other suitable indication. In some embodiments, the video can be a video that is currently included in the collection of videos. In some such embodiments, a user's vote can indicate that the user wants the video to be removed from the collection of videos and/or moved in position (higher or lower) within the collection of videos. Additionally or alternatively, the video can be a video that is not currently included in the collection of videos. For example, in some embodiments, the video can be a video that was returned as a result from a search query, a video that was presented as a recommendation to the user, a video that was featured on a home page of a video sharing service, and/or any other suitable video.

Figure 8:
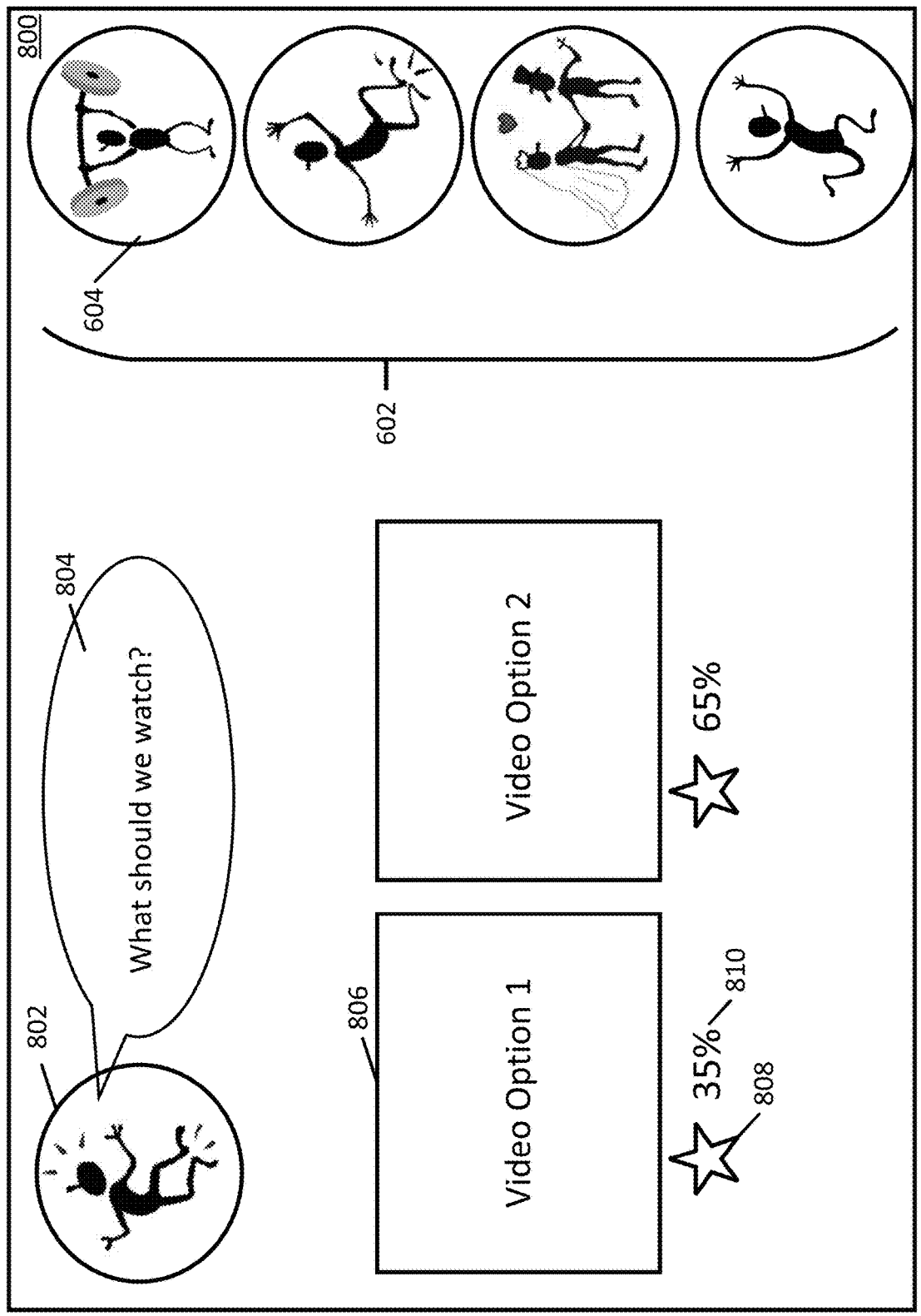
FIG. 8 shows an example of a user interface of a poll associated with a stream of content in accordance with some embodiments of the disclosed subject matter.

Another example 800 of a user interface for receiving votes from viewers of a stream of content is shown in FIG. 8. As illustrated, user interface 800 can include a message posted by a creator of the collection of media content items, for example, asking viewers to choose between two possible content items to view next. In some embodiments, the message from the creator of the collection of media content items can include an image associated with the creator (e.g., a profile picture 802, and/or any other suitable image) and a message 804. Additionally, in some embodiments, user interface 800 can include one or more choices (e.g., an option 806 as shown in FIG. 8) selected by the creator for inclusion in the stream of content (e.g., to be presented next, to be added at the end of a queue of content items, and/or included in any other suitable position). In some embodiments, user interface 800 can additionally include an icon (e.g., icon 808 as shown in FIG. 8) that can be selected by a viewer to vote for the content item associated with the icon. In some embodiments, user interface 800 can indicate a proportion of viewers that have voted for each choice of content item, for example, by a vote indicator 810 as shown in FIG. 8. Additionally or alternatively, in some embodiments, user interface 800 can include any other suitable information, such as a time remaining for voting on the choices, an indicator of popularity of each choice of content item (e.g., a total number of views, a rating, and/or any other suitable popularity information), and/or any other suitable information.

Referring back to FIG. 5, at 514, process 500 can update the collection of videos based on the second input received at 512 as well as inputs from multiple user devices. For example, in instances where the video is currently included in the collection of videos, a position of the video within the collection of videos can be modified. As a more particular example, if the video receives more than a predetermined number of votes and/or a rating higher than a predetermined rating (e.g., averaged over inputs from multiple users), the video can be moved to a higher position within the collection of videos. As a specific example, in some embodiments, the video can be moved to be next in the queue such that the video is presented after a video that is currently being presented finishes. As another specific example, in some embodiments, presentation of the video can begin immediately, causing a video that is currently being presented to be paused and/or stopped. As another more particular example, in instances where the inputs from the multiple user devices indicates that the video has received more than a predetermined number of downvotes (e.g., more than ten, more than twenty, and/or any other suitable number) and/or that more than a predetermined ratio of viewers dislike a video relative to viewers who like the video, the video can be removed from the collection of videos and/or moved to a lower position in the queue.

As another example, in instances where the video is not currently included in the collection of videos, the video can be added to the collection of videos in any suitable position. As a more particular example, in some embodiments, the video can be added at the end of the queue of the collection of videos. As another more particular example, in some embodiments, the video can be inserted at the first position in the queue of the collection of videos such that the video is played after a video that is currently being presented.

Note that, in some embodiments, indications of videos that have received upvotes, downvotes, and/or endorsements can be presented in connection with an indicator of the received votes. For example, in instances where a predetermined number of votes is required to add a video to a collection of videos, remove a video from a collection of videos, and/or change a position of a video within a collection of videos, a meter and/or running tally of the votes can be presented indicating how many votes remain for the associated action to occur. As another example, in some embodiments, a number of votes that have been received can be presented.

It should be understood that at least some of the above described blocks of the processes of FIG. 5 can be executed or performed in any order or sequence not limited to the order and sequence shown in and described in the figure. Also, some of the above blocks of the process of FIG. 5 can be executed or performed substantially simultaneously where appropriate or in parallel to reduce latency and processing times. Additionally or alternatively, some of the above described blocks of the process of FIG. 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for facilitating interactions of viewers of a stream of content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for facilitating interaction between viewers of a stream of content, comprising:
   receiving, from a first user device, a request to begin presenting a stream of content, wherein the stream of content corresponds to a collection of videos presented sequentially;
   identifying a counter value associated with a duration of time elapsed since a creator of the stream of content initiated presentation of the stream of content from a second user device;
   determining a playback position of the stream of content on the first user device based on the counter value;
   causing the stream of content to be presented on the first user device at the determined playback position;
   receiving, from the first user device, an input to display a chat interface on the first user device;
   causing the chat interface to be presented on the first user device in connection with the presentation of the stream of content, wherein the chat interface includes messages transmitted from a plurality of user devices other than the first user device that are also presenting the stream of content, wherein the messages transmitted from the plurality of user devices that are also presenting the stream of content are presented in a first portion of the chat interface, and wherein the chat interface includes a plurality of selectable inputs, each representing an image, wherein selection of a selectable input from the plurality of selectable inputs by the first user device causes the image to be presented in a second portion of the chat interface when the chat interface is presented on the plurality of user devices that are also presenting the stream of content;
   receiving video content from the second user device associated with the creator of the stream of content; and
   causing the video content received from the second user device associated with the creator of the stream of content to be presented in a window overlaid on the stream of content on each of the plurality of user devices and the first user device concurrently with presentation of the stream of content on each of the plurality of user devices and the first user device.

2. The method of claim 1, wherein an initial position of each video within the collection of videos corresponding to the stream of content is specified by the creator of the stream of content.

3. The method of claim 1, further comprising:
   receiving a plurality of votes from a second plurality of user devices; and
   modifying the collection of videos corresponding to the stream of content based on the plurality of votes.

4. The method of claim 3, wherein modifying the collection of videos comprises adding a video associated with the plurality of votes to the collection of videos.

5. The method of claim 3, wherein modifying the collection of videos comprises moving a position of a video associated with the plurality of votes within the collection of videos.

6. The method of claim 5, wherein moving the position of the video associated with the plurality of votes comprises causing the video to be played after presentation of a video that is currently being presented is finished.

7. The method of claim 1, wherein the stream of content has a start point and an end point, and wherein the method further comprises:
   initiating presentation of the stream of content at the start point in response to receiving an indication from the second user device associated with the creator of the stream of content;
   determining that presentation of the stream of content has reached the end point; and
   causing the stream of content to be presented from the start point.

8. A system for facilitating interaction between viewers of a stream of content, the system comprising:
   a hardware processor that is programmed to:
   receive, from a first user device, a request to begin presenting a stream of content, wherein the stream of content corresponds to a collection of videos presented sequentially;
   identify a counter value associated with a duration of time elapsed since a creator of the stream of content initiated presentation of the stream of content from a second user device;
   determine a playback position of the stream of content on the first user device based on the counter value;
   cause the stream of content to be presented on the first user device at the determined playback position;
   receive, from the first user device, an input to display a chat interface on the first user device;
   cause the chat interface to be presented on the first user device in connection with the presentation of the stream of content, wherein the chat interface includes messages transmitted from a plurality of user devices other than the first user device that are also presenting the stream of content, wherein the messages transmitted from the plurality of user devices that are also presenting the stream of content are presented in a first portion of the chat interface, and wherein the chat interface includes a plurality of selectable inputs, each representing an image, wherein selection of a selectable input from the plurality of selectable inputs by the first user device causes the image to be presented in a second portion of the chat interface when the chat interface is presented on the plurality of user devices that are also presenting the stream of content;

receive video content from the second user device associated with the creator of the stream of content; and cause the video content received from the second user device associated with the creator of the stream of content to be presented in a window overlaid on the stream of content on each of the plurality of user devices and the first user device concurrently with presentation of the stream of content on each of the plurality of user devices and the first user device.

9. The system of claim 8, wherein an initial position of each video within the collection of videos corresponding to the stream of content is specified by the creator of the stream of content.

10. The system of claim 8, wherein the hardware processor is further programmed to:
receive a plurality of votes from a second plurality of user devices; and
modify the collection of videos corresponding to the stream of content based on the plurality of votes.

11. The system of claim 10, wherein the hardware processor is further programmed to add a video associated with the plurality of votes to the collection of videos.

12. The system of claim 10, wherein the hardware processor is further programmed to move a position of a video associated with the plurality of votes within the collection of videos.

13. The system of claim 12, wherein the hardware processor is further programmed to cause the video to be played after presentation of a video that is currently being presented is finished.

14. The system of claim 8, wherein the stream of content has a start point and an end point, and wherein the hardware processor is further programmed to:
initiate presentation of the stream of content at the start point in response to receiving an indication from the second user device associated with the creator of the stream of content;
determine that presentation of the stream of content has reached the end point; and
cause the stream of content to be presented from the start point.

15. A non-transitory computer-readable medium containing computer executable instructions that, when executed by a processor, cause the processor to perform a method for facilitating interaction between viewers of a stream of content, the method comprising:
receiving, from a first user device, a request to begin presenting a stream of content, wherein the stream of content corresponds to a collection of videos presented sequentially;
identifying a counter value associated with a duration of time elapsed since a creator of the stream of content initiated presentation of the stream of content from a second user device;
determining a playback position of the stream of content on the first user device based on the counter value;
causing the stream of content to be presented on the first user device at the determined playback position;
receiving, from the first user device, an input to display a chat interface on the first user device;
causing the chat interface to be presented on the first user device in connection with the presentation of the stream of content, wherein the chat interface includes messages transmitted from a plurality of user devices other than the first user device that are also presenting the stream of content, wherein the messages transmitted from the plurality of user devices that are also presenting the stream of content are presented in a first portion of the chat interface, and wherein the chat interface includes a plurality of selectable inputs, each representing an image, wherein selection of a selectable input from the plurality of selectable inputs by the first user device causes the image to be presented in a second portion of the chat interface when the chat interface is presented on the plurality of user devices that are also presenting the stream of content;
receiving video content from the second user device associated with the creator of the stream of content; and
causing the video content received from the second user device associated with the creator of the stream of content to be presented in a window overlaid on the stream of content on each of the plurality of user devices and the first user device concurrently with presentation of the stream of content on each of the plurality of user devices and the first user device.

16. The non-transitory computer-readable medium of claim 15, wherein an initial position of each video within the collection of videos corresponding to the stream of content is specified by the creator of the stream of content.

17. The non-transitory computer-readable medium of claim 15, wherein the method further comprises:
receiving a plurality of votes from a second plurality of user devices; and
modifying the collection of videos corresponding to the stream of content based on the plurality of votes.

18. The non-transitory computer-readable medium of claim 17, wherein modifying the collection of videos comprises adding a video associated with the plurality of votes to the collection of videos.

19. The non-transitory computer-readable medium of claim 17, wherein modifying the collection of videos comprises moving a position of a video associated with the plurality of votes within the collection of videos.

20. The non-transitory computer-readable medium of claim 19, wherein moving the position of the video associated with the plurality of votes comprises causing the video to be played after presentation of a video that is currently being presented is finished.

21. The non-transitory computer-readable medium of claim 15, wherein the stream of content has a start point and an end point, and wherein the method further comprises:
initiating presentation of the stream of content at the start point in response to receiving an indication from the second user device associated with the creator of the stream of content;
determining that presentation of the stream of content has reached the end point; and
causing the stream of content to be presented from the start point.

* * * * *